United States Patent
Husberg et al.

(10) Patent No.: US 11,104,223 B2
(45) Date of Patent: Aug. 31, 2021

(54) TANK CLOSURE

(71) Applicant: Hella GmbH & Co. KGaA, Lippstadt (DE)

(72) Inventors: Olaf Husberg, Warburg (DE); Henning Irle, Lippstadt (DE); Ingo Niemeyer, Moehnesee (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 310 days.

(21) Appl. No.: 16/135,381

(22) Filed: Sep. 19, 2018

(65) Prior Publication Data

US 2019/0084411 A1   Mar. 21, 2019

(30) Foreign Application Priority Data

Sep. 19, 2017  (DE) .................... 10 2017 121 665.0

(51) Int. Cl.
*B60K 15/04* (2006.01)
*B60K 15/05* (2006.01)

(52) U.S. Cl.
CPC .......... *B60K 15/0406* (2013.01); *B60K 15/05* (2013.01); *B60K 2015/0422* (2013.01); *B60K 2015/0451* (2013.01); *B60K 2015/053* (2013.01)

(58) Field of Classification Search
CPC ................ B60K 15/0406; B60K 15/05; B60K 2015/0422; B60K 2015/0451; B60K 2015/053
USPC ....................................... 296/97.22; 220/86.2
See application file for complete search history.

(56) References Cited

U.S. PATENT DOCUMENTS

| 5,234,122 | A |   | 8/1993 | Cherng |
| 5,472,108 | A |   | 12/1995 | Skudlarek |
| 5,524,786 | A |   | 6/1996 | Skudlarek |
| 6,053,992 | A | * | 4/2000 | Wu ........................ F02M 59/44 |
|   |   |   |   | 148/402 |
| 6,193,093 | B1 |   | 2/2001 | Brunner |
| 6,234,555 | B1 | * | 5/2001 | Emmerich ............. B60K 15/04 |
|   |   |   |   | 220/86.2 |
| 6,325,240 | B1 | * | 12/2001 | Gruber ............... B60K 15/0406 |
|   |   |   |   | 220/326 |

(Continued)

FOREIGN PATENT DOCUMENTS

| DE |         19846498 A1 | 4/2000 |
| DE | 202004013094 U1 | 1/2006 |

(Continued)

OTHER PUBLICATIONS

Extract from 'Spiegel Online' (www.spiegel.de/auto/werkstatt/neuer-tankverschluss-wie-in-der-boxengasse-a-216770.html), Oct. 7, 2002, "Neuer Tankverschluss Wie in der Boxengasse".

*Primary Examiner* — Joseph D. Pape
(74) *Attorney, Agent, or Firm* — Muncy, Geissler, Olds & Lowe, P.C.

(57) ABSTRACT

A closure component of a tank of a motor vehicle for closing a filler neck gas- and fluid-tight, having a closure fastened to a flap, the flap being fastened to a vehicle body of the motor vehicle such that it is movable into an open or closed position, the closure including a seal, which causes the closure to close against the filler neck. The tank closure should be easy for a user to handle and have a relatively simple design and be economical to manufacture. This is achieved in that the seal is electromechanically or pneumatically adjustable with the aid of an actuator.

10 Claims, 3 Drawing Sheets

(56) References Cited

U.S. PATENT DOCUMENTS 6,478,360 B1    11/2002  Reutter

FOREIGN PATENT DOCUMENTS

EP           0658484  A1    6/1995
WO        WO0029239  A1    5/2000

\* cited by examiner

TANK CLOSURE

This nonprovisional application claims priority under 35 U.S.C. § 119(a) to German Patent Application No. 10 2017 121 665.0, which was filed in Germany on Sep. 19, 2017, and which is herein incorporated by reference.

BACKGROUND OF THE INVENTION

Field of the Invention

The present invention relates to a closure of a tank of a motor vehicle for closing a filler neck gas- and liquid-tight, comprising a closure fastened to a flap, the flap being fastened to a vehicle body of the motor vehicle such that it is movable into an open or closed position, the closure including a seal, which causes the closure to close against the filler neck.

Description of the Background Art

In most motor vehicles, in particular passenger cars and small trucks, a pivoted flap is introduced into a vehicle body, behind which a filler neck is disposed, e.g. for a fuel tank. The flap is preferably flush with the vehicle body to avoid disturbing the overall optical impression and the aerodynamics. The filler neck is separately closed in a sealing manner with the aid of a cover; for example, annular disk seals and screw threads or bayonet joints are provided for this purpose. To fuel the motor vehicle, the flap and then the cover must first be opened, and both must be closed again in reverse order after fueling. This is relatively complex. In addition, it is possible to forget to close the cover, and the latter may then get lost.

Methods are known (http://www.spiegel.de/auto/werkstatt/neuer-tankverschluss-wie-in-der-boxengasse-a-216770.html) for designing a closure for a filler neck of a motor vehicle without a cover. For this purpose, a hood made from an elastic material is fastened to the inside of a flap assigned to the filler neck, which is pressed against an area surrounding the filler neck when the flap is closed. In addition, a filling opening is closed with the aid of a spring-loaded sealing flap. The closure does not ensure a complete tightness. In addition, a relatively great contact pressure must be ensured by the flap, so that the entire structure must be designed to be correspondingly stable and heavy.

A closure for a filler neck is disclosed in U.S. Pat. No. 5,234,122 A, in which a cover as the closure may be opened together with an assigned flap with the aid of an electric motor. A very complex mechanism is provided for this purpose, which is made up of many individual parts and is correspondingly expensive to manufacture and mount.

U.S. Pat. No. 5,524,786 A shows a plug-like tank closure, which is detachably fastened to a filler neck, e.g. with the aid of detents. The detents are lockable and unlockable with the aid of an electric drive. During unlocking, a spring presses the tank closure outwardly. A cover, which is flush with a vehicle body when the tank closure is locked, is fastened at the outer longitudinal end thereof. As a result, a flap is not provided. The tank closure is bulky and complex.

A plug-like tank closure is known from EP 658 484 A1, which corresponds to U.S. Pat. No. 5,472,108, which is lockable in a closed and an intermediate position. Opening the tank closure is associated with additional complexity due to the intermediate lock. A flap is not present.

WO 00/29239 A1, which corresponds to U.S. Pat. No. 6,478,360, discloses a closure for a fuel tank, which is fastened to a flap. The closure comprises a cover portion and a plug-like insertion portion. The cover portion is used to seal the fuel tank in connection with a flat seal, and the insertion portion is used to lock the closure in connection with a contact element as well as an undercut formed in a filler neck. The closure is complex.

SUMMARY OF THE INVENTION

It is therefore an object of the present invention to provide a tank closure, which is easy for a user to handle and has a relatively simple design and is economical to manufacture.

A seal can be electromechanically or pneumatically adjustable. The seal may be used, on the one hand, for its actual purpose—namely to close the filler neck gas- and fluid-tight—and, on the other hand, as a lock for preventing unauthorized opening of the closure.

The handling by driver during fueling of a motor vehicle is very easy: He only has to open the flap; the closure device is thus removed from the filler neck without any further action, so that a fuel pump nozzle may be inserted. To end the fueling, only the flap needs to be closed after the fuel pump nozzle is removed.

The component for adjusting the seal, i.e. the actuator, is easy and correspondingly economical to manufacture. They comprise, for example, an electric motor, an electromagnetic drive, an electroactive polymer, an electrically influenceable shape memory alloy or an electrically influenceable shape memory polymer. The component is driven, for example with the aid of a switch or a sensor.

The closure may be designed as a cover or as a plug. The seal is fastened to either the closure or the filler neck. The filler neck is manufactured from an elastic and/or rigid material.

The closure can be designed as a plug, which is surrounded by the annular seal over at least one portion of its length when the flap is closed. The plug extends into the filler neck when the fuel tank is closed. A length of the plug is dimensioned in such a way that it may be pulled out of the filler neck without problems upon opening the flap, to which it is fastened in an articulated manner.

The seal is fastened to an inner wall of the filler neck in such a way that it is able to interact with the plug. A clearance between the plug and the seal is selected to be as small as possible, so that, on the one hand, its insertion into or removal from the filler neck is not disturbed and, on the other hand, the adjustment of the seal for sealing purposes is associated with preferably short distances.

The plug and the seal are easy and light-weight to manufacture and may be assembled with little complexity. The component for adjusting the seal may be easily mounted on the outside of the filler neck or alternatively be integrated into the seal.

The plug can have a tapering in a central area. On the one hand, the seal is easier to achieve because it is already sufficient when the seal is pressed against the sections of the plug which are situated between the tapered and non-tapered sections. On the other hand, the holding forces are increased against a removal of the plug when the closure is closed, so that an unauthorized opening of the flap and thus theft of fuel is at least made more difficult.

The adjustment of the seal can take place by changing a cross section of the filler neck. For this purpose, the filler neck is manufactured from a soft elastic material in the corresponding area. The adjustment may be easily and securely effectuate electromechanically or pneumatically.

The cross section of the filler neck may be reduced in size with respect to a setpoint cross section. The latter is present when the closure is open and is reduced in size for sealing purposes.

The cross section of the filler neck may be widened with respect to a setpoint cross section. The latter is present when the closure is closed and is widened to open the flap.

The adjustment of the seal can take place by independently changing its shape. The seal is manufactured from an electroactive polymer in the manner of an artificial muscle. Although the seal is more complex, its manufacture and assembly are on the whole simplified.

The closure can be fastened to the flap in an articulated manner. This makes the closure easier for a user to handle.

A sensor is provided for detecting a filling operation of the fuel tank, which acts upon an adjustment of the seal via a vehicle electronic system. A spout of a fuel pump nozzle may be surrounded by the seal during fueling, so that an escape of fuel vapors is prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The first exemplary embodiment illustrated in FIG. 1 relates to a closure of a fuel tank 1 of a motor vehicle, in which a cross section of a filler neck 2 may be reduced from an initial size (zero cross section) to a closing size in an area in which a seal 3 is fastened to its inside.

Figure 1A:
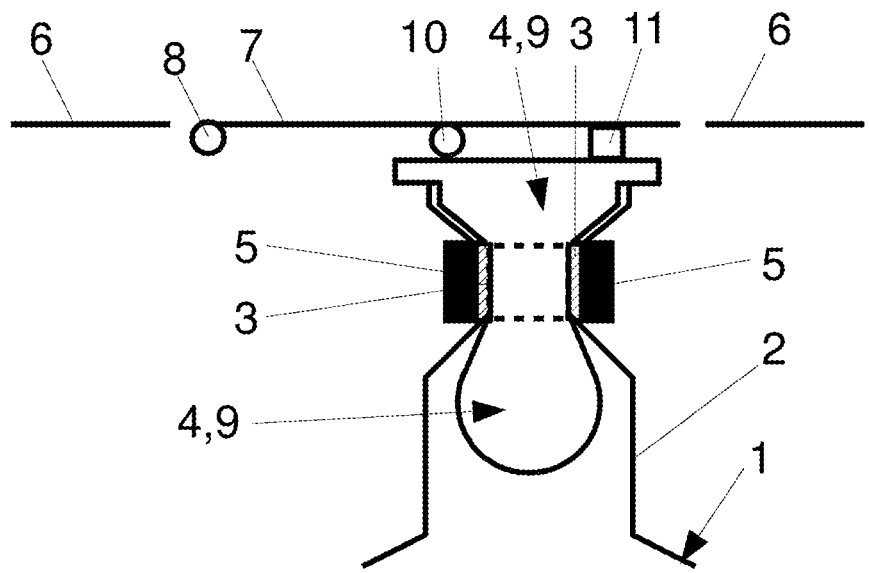
FIGS. 1a and 1b show a cross section of a closure, in which a filler neck, and thus a seal, may be constricted.
Figure 1B:
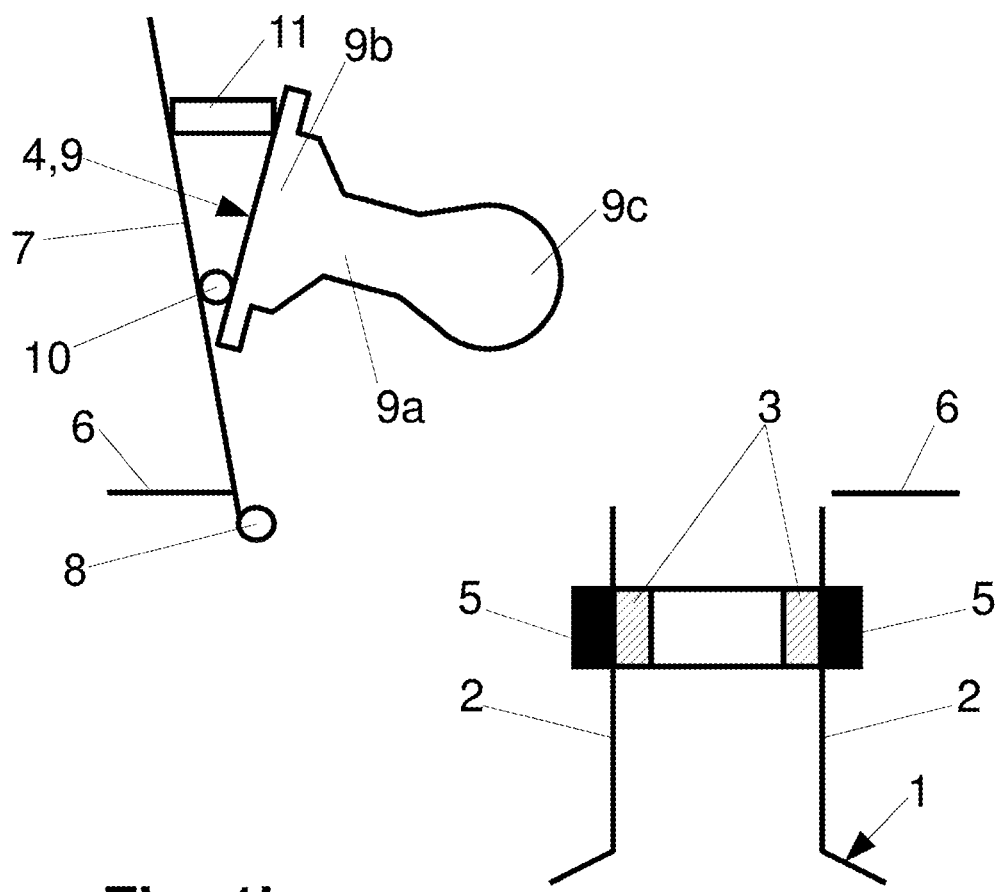

FIG. 1a shows the closure with filler neck 2 in a closed state, and FIG. 1b shows the closure with the filler neck in the open state, i.e. a closure 4 is situated in filler neck 2 or outside the latter.

Seal 3 is manufactured from a suitable elastic sealing material, such as NBR (nitrile butadiene rubber) or FHP (fluorinated hydrocarbon poymerizate), in the form of a short tube section. In the relaxed state, an outer diameter of seal 3 is adapted to an inner diameter of filler neck 2 in the initial size, which corresponds to the opened state of the closure, and an inner diameter of seal 3 is adapted to an assigned diameter of closure 4, in this case the diameter of a tapered part of closure 4.

Filler neck 2 has a circular cross section and is manufactured from an elastically deformable material, such as NBR or FHP, at least in an area of an outer end.

An annular actuator 5 for the electromechanical adjustment of seal 3 is fastened on the outside of filler neck 2.

Actuator 5 includes, for example, a strap which is wrapped around filler neck 2, and an electric motor or an electromagnetic drive. A first end of the strap is fastened, for example, to a vehicle body 6 of the motor vehicle, and a second end of the strap is operatively connected to the electric motor or the electromagnetic drive in such a way that the wrap radius of the strap may be increased or reduced in size.

Alternatively to the strap and the electric motor or the drive, actuator 5 includes a hose-like structure, which is wrapped around filler neck 2, and a pump having an electric drive.

In another alternative, actuator 5 is formed from an electroactivatable polymer in the manner of an artificial muscle.

All actuators 5 as described above are considered electromechanical or pneumatic within the meaning of this disclosure.

Closure 4 is fastened in an articulated manner to a flap 7, which is disposed on vehicle body 6 such that it is pivotable into an open or a closed position with the aid of a hinge 8, for example. The open position of flap 7 corresponds to opened filler neck 2, and the closed position corresponds to closed filler neck 2.

The articulated fastening of closure 4 to flap 7 includes a joint 10 as well as an elastic element 11, in the form of a spring, for example. In this way, it is ensured that closure 4 is largely coaxially aligned with filler neck 2 in the direct vicinity thereof. This prevents a tilting of closure 4 during the opening or closing of the closure.

Closure 4 is designed as a plug 9 having a circular cross section, which is widened at its ends with respect to a central part; or in other words, the central part of plug 9 has a tapering 9a. A first end, which is fastened to flap 7, is designed in the manner of a cover 9b, and a second free end, which extends into filler neck 2 when the latter is closed, is designed in the form of a spherical section 9c. Plug 9 is conically shaped as a transition between cover 9b and tapering 9a. The following applies to diameter Ø of the cross sections: Ø tapering 9a<Ø spherical section 9c<Ø cover 9b.

Any other shape of a widening with respect to central part of plug 9 may be used instead of spherical section 9c.

An operation of the closure is handled and controlled as follows:

To open the closure, actuator 5 is driven in such a way that the diameter of filler neck 2, which is reduced in size in the area of seal 3 in the closed state, is increased to the initial size, and closure 4 is thereby released for opening. The driving action is activated, for example, by pressing a pushbutton in the interior of the motor vehicle or by pressing flap 7 which actuates a so-called push-push mechanism or a pushbutton for this purpose. Alternatively the driving action is activated with the aid of a sensor, which detects gestures or, upon pressing flap 7, e.g. a change in pressure (e.g. in seal 3) and generates corresponding control signals.

Flap 7 can now be opened manually in the usual manner, closure 4 being pulled out of filler neck 2 at the same time. Alternatively, flap 7 is opened electromotively.

The actual fueling may then begin after inserting a fuel pump nozzle into filler neck 2.

After the fueling is complete, the fuel pump nozzle is removed and flap 7 is closed, closure 4 being simultaneously inserted into filler neck 2. Actuator 5 is driven in such a way that the reduced diameter of filler neck 2, and thus the necessary seal, is reestablished. The driving action is activated either manually, using the means mentioned above for opening, or automatically, e.g. with the aid of a sensor or RFID (radio frequency identification).

For countries in which a vapor extraction by the fuel pump nozzle is not customary during fueling, it is sensible to also use seal 3 together with actuator 5 for fueling purposes. In this case, actuator 5 is driven, for example, via RFID and a flow sensor. Displaced gas volume is conducted to the outside via an integrated filter system.

Actuator 5 is preferably deenergized when the closure is closed.

The second exemplary embodiment illustrated in FIG. 2 relates to the closure of fuel tank 1, in which a cross section of filler neck 2 may be increased from an initial size (zero cross section), in which the closure is closed, to an open size in an area in which seal 3 is fastened to its inside.

Figure 2A:
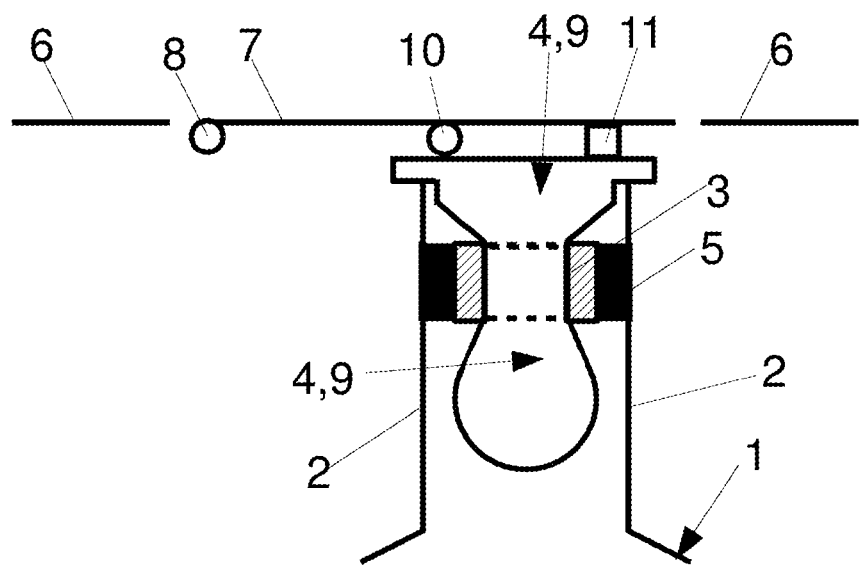
FIGS. 2a and 2b show a cross section of a closure, in which a filler neck, and thus a seal, may be widened.
Figure 2B:
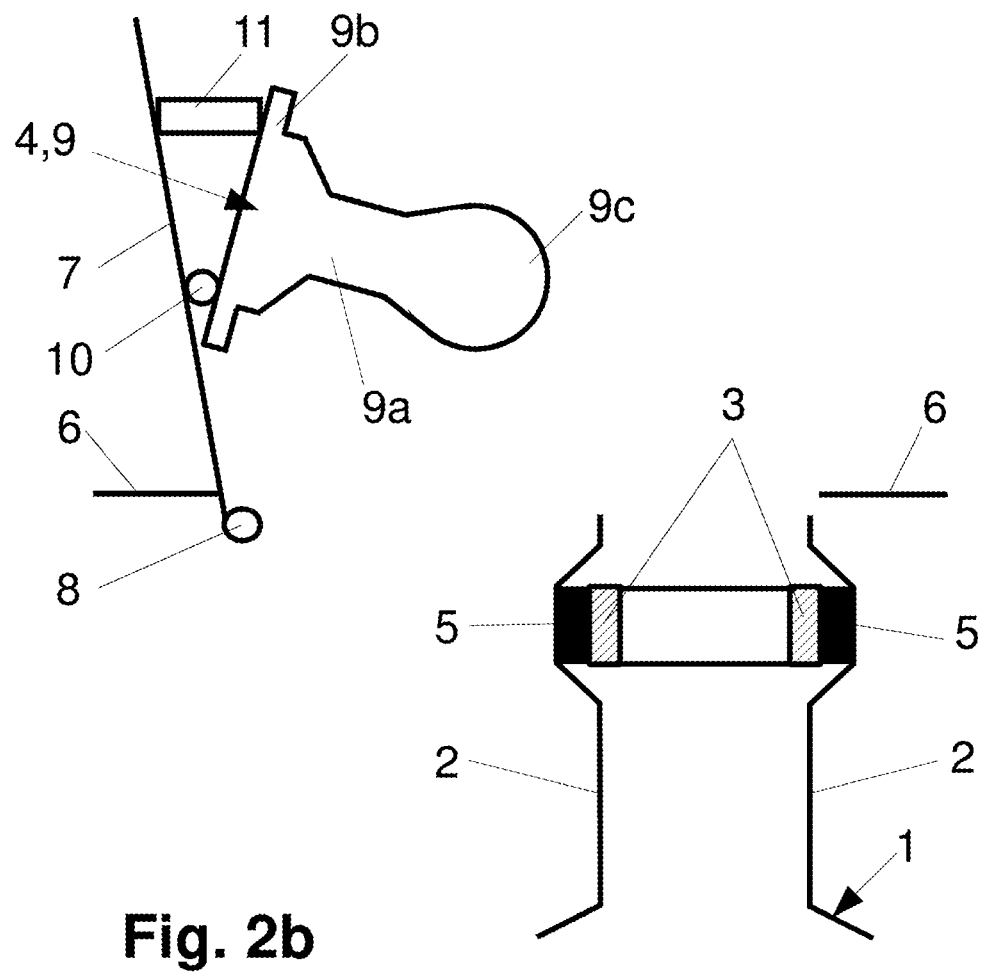

FIG. 2a shows the closure with filler neck 2 in the closed state and FIG. 2b shows the closure with the filler neck in the open state, i.e. a closure 4 is situated in filler neck 2 or outside the latter.

The second exemplary embodiment also differs from the first exemplary embodiment as follows:

In the relaxed state, an outer diameter of seal 3 is adapted to the inner diameter of filler neck 2 in the initial size, which corresponds to the closed state of the closure, and the inner diameter of seal 3 is adapted to the assigned diameter of closure 4.

Actuator 5 is fastened to filler neck 2 on the inside or the outside. It includes, for example, a hose-like structure, which is wrapped around seal 3 or filler neck 2, and a pump having an electric drive.

In one alternative, actuator 5 is formed from an electroactivatable polymer in the manner of an artificial muscle.

Otherwise, the second exemplary embodiment matches the first exemplary embodiment.

The operation and control largely correspond to the description of the first exemplary embodiment, differing with regard to the respective reverse decrease and increase in size of of the cross section of filler neck 2.

The third exemplary embodiment illustrated in FIG. 3 relates to a closure of a fuel tank 1 of a motor vehicle, in which a cross section of seal 3, which is fastened to an inside of filler neck 2, may be decreased from an initial size (cross section for the closed closure) to an open size.

Figure 3A:
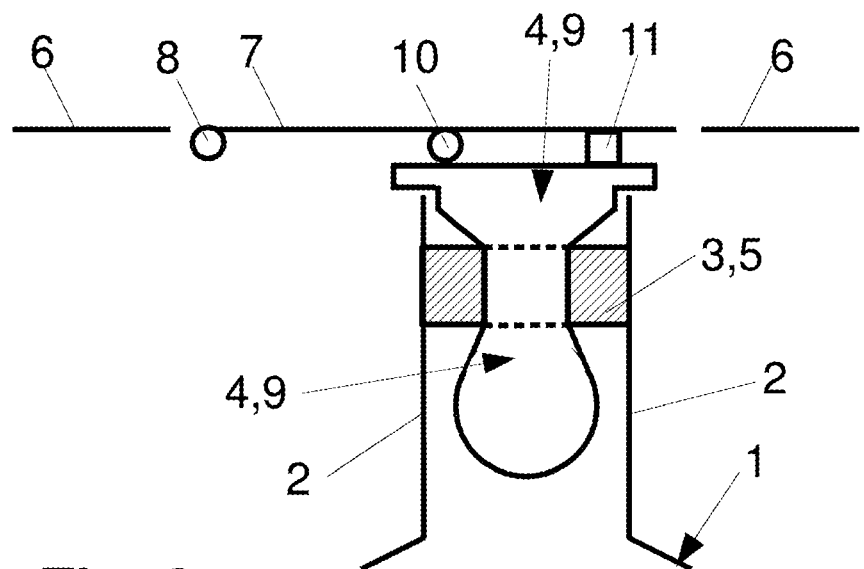
FIGS. 3a and 3b shows a cross section of a closure, including a seal whose shape is independently changeable.
Figure 3B:
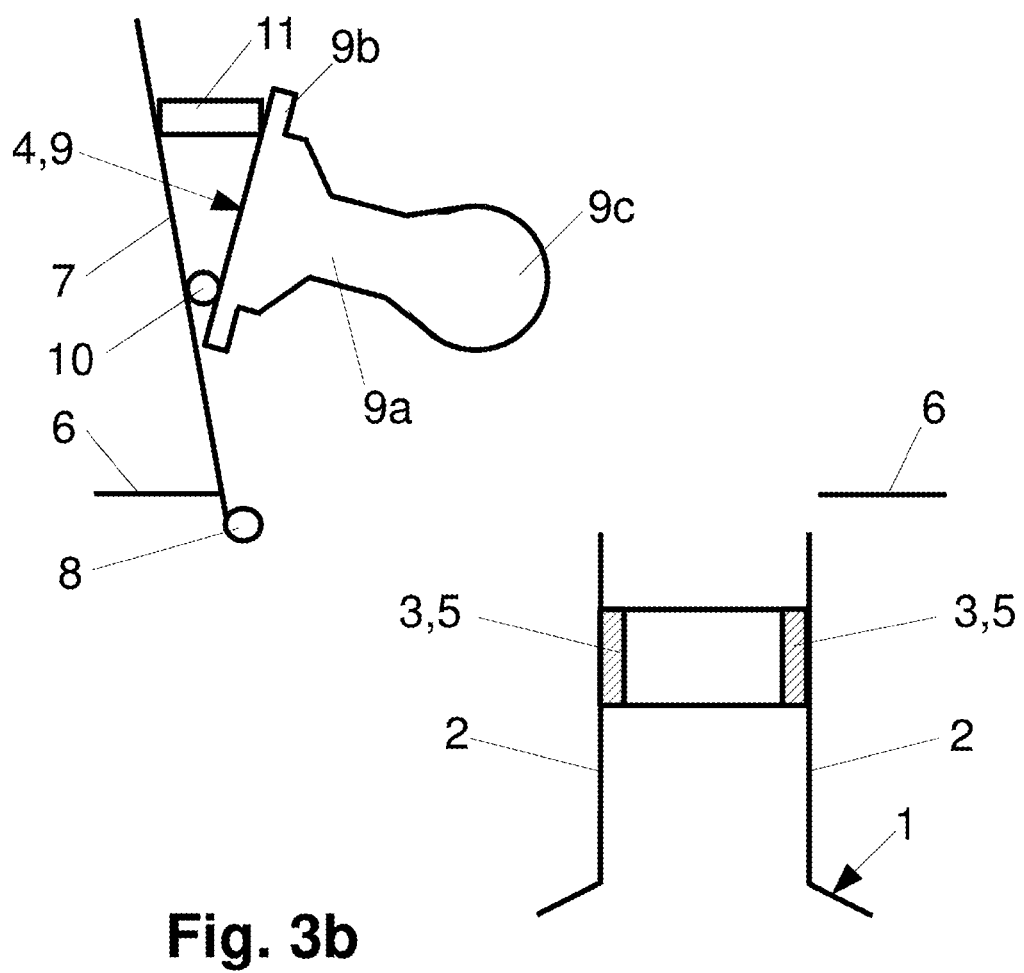

FIG. 3a shows the closure with filler neck 2 in the closed state and FIG. 3b shows the closure with the filler neck in the open state, i.e. a closure 4 is situated in filler neck 2 or outside the latter.

The third exemplary embodiment also differs from the first exemplary embodiment as follows:

Filler neck 2 is manufactured from a hard material which is deformable only with difficulty.

Seal 3 is designed as actuator 5 and to be actively deformable in and of itself. This means that the adjustment of seal 3 takes place by independently changing its shape. Seal 3 is manufactured for this purpose in the manner of an electric muscle in such a way that it reduces the size of its cross section upon the application of an electric voltage, i.e. an inner diameter of seal 3 is reduced in size upon the application of the electric voltage.

Otherwise, the third exemplary embodiment matches the first exemplary embodiment.

The operation and control take place similarly to the description of the first exemplary embodiment, with the difference that seal 3 is driven directly and is deformed hereby according to the requirements. Filler neck 2 itself is not deformed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A closure component for a tank of a motor vehicle for closing a filler neck, the closure component comprising:
   a closure fastened to a flap, the flap being fastened to a vehicle body of the motor vehicle such that the flap and the closure are movable into an open position or a closed position, and
   a seal, which causes the closure to close against the filler neck when the closure is in the closed position,
   wherein the seal is electromechanically or pneumatically adjustable with the aid of an actuator, and
   wherein adjustment of the seal takes place by changing a cross section of the filler neck, such that when the closure is in the open position, the cross section of the filler neck is larger than when the closure is in the closed position.

2. The closure according to claim 1, wherein the closure is a plug, which is inserted into the filler neck and surrounded by the seal when the flap is in the closed position.

3. The closure according to claim 2, wherein the plug has a tapering in a central area.

4. The closure according to claim 1, wherein the cross section of the filler neck is reduced in size when the closure is changed from the open position to the closed position.

5. The closure according to claim 1, wherein the cross section of the filler neck is widened when the closure is changed from the closed position to the open position.

6. The closure according to claim 1, wherein the adjustment of the seal takes place by independently changing a shape thereof.

7. The closure according to claim 1, wherein the closure is fastened to the flap in an articulated manner.

8. A closure component for a fuel tank of a motor vehicle for closing a filler neck, the closure component comprising:
   a closure fastened to a flap, the flap being fastened to a vehicle body of the motor vehicle such that the flap and the closure are movable into an open position or a closed position, and
   a seal, which causes the closure to close against the filler neck,
   wherein the seal is electromechanically or pneumatically adjustable with the aid of an actuator, and
   wherein a sensor is provided for detecting a filling operation of the fuel tank, which acts upon an adjustment of the seal via a vehicle electronic system.

9. The closure according to claim 1, wherein the seal is annular and is positioned inside of the filler neck and wherein the seal remains inside of the filler neck when the closure is in the open position.

10. The closure according to claim 9, wherein the actuator is aligned with the seal and the actuator directly contacts either an exterior surface or an interior surface of the filler neck.

* * * * *